United States Patent
Chuang

(10) Patent No.: US 9,533,388 B2
(45) Date of Patent: Jan. 3, 2017

(54) ADJUSTING DEVICE FOR LIFTING AND LOWERING A WORKBENCH

(71) Applicant: Bor-Yann Chuang, Taichung (TW)

(72) Inventor: Bor-Yann Chuang, Taichung (TW)

( * ) Notice: Subject to any disclaimer, the term of this patent is extended or adjusted under 35 U.S.C. 154(b) by 163 days.

(21) Appl. No.: 14/611,937

(22) Filed: Feb. 2, 2015

(65) Prior Publication Data
US 2016/0221136 A1    Aug. 4, 2016

(51) Int. Cl.
| | | |
|---|---|---|
| *B23Q 1/46* | (2006.01) | |
| *A47B 9/00* | (2006.01) | |
| *B25H 1/04* | (2006.01) | |
| *B23Q 1/58* | (2006.01) | |
| *B23Q 16/02* | (2006.01) | |

(52) U.S. Cl.
CPC . *B23Q 1/46* (2013.01); *A47B 9/00* (2013.01); *B23Q 1/585* (2013.01); *B23Q 16/024* (2013.01); *B25H 1/04* (2013.01); *Y10T 409/309128* (2015.01)

(58) Field of Classification Search
CPC ....... A47B 2009/185; A47B 9/00; A47B 9/14; A47B 9/18; B23Q 1/46; B23Q 1/16; Y10T 409/309128
USPC .............. 108/144.1, 144.11; 144/286.1, 287; 248/188.5, 188.4, 346.05; 254/98; 409/219, 409/227
See application file for complete search history.

(56) References Cited

U.S. PATENT DOCUMENTS

| | | | | |
|---|---|---|---|---|
| 1,685,920 A * | 10/1928 | Kearney | ................... | B23Q 1/25 29/DIG. 102 |
| 2,947,227 A * | 8/1960 | Parske | ................... | B23Q 1/267 409/227 |
| 3,104,493 A * | 9/1963 | Nalle | ................... | A47B 91/028 248/188.4 |
| 3,397,934 A * | 8/1968 | Dushek | ................... | A47B 57/06 108/144.11 |
| 3,807,034 A * | 4/1974 | Pevzner | ............... | B23Q 1/0054 108/7 |
| 4,515,087 A * | 5/1985 | Kurrasch | ................. | A47B 9/00 108/147 |
| 5,332,182 A * | 7/1994 | Weisz | ................... | G01G 23/002 248/188.4 |
| 5,517,354 A * | 5/1996 | Mika | ....................... | G02B 21/24 359/391 |
| 5,829,501 A * | 11/1998 | DeVito | ..................... | B25H 1/02 108/162 |
| 6,038,982 A * | 3/2000 | Witzig | .................... | A47B 17/02 108/145 |
| 7,275,730 B2 * | 10/2007 | Bender | ..................... | F16M 7/00 248/118.3 |

(Continued)

*Primary Examiner* — Joseph J Hail
*Assistant Examiner* — Tyrone V Hall, Jr.
(74) *Attorney, Agent, or Firm* — Ming Chow Sinorica, LLC

(57) ABSTRACT

An adjusting device for lifting and lowering a workbench is provided between a workbench and a workbench rest. An adjusting seat is firmly secured with the workbench rest and an adjusting wheel is screwed and locked on the adjusting seat. A screwing fastener is inserted through the underside of the workbench and the adjusting wheel, and an elastic member is provided between an upper flange of the screwing fastener and the topside of a fixed plate of the workbench. Thus, by the prestress of the elastic member pushing against the workbench, the workbench can be surely driven by screw rotation of the adjusting wheel and hence the adjusting wheel can easily drive the workbench to move up and down.

9 Claims, 6 Drawing Sheets

(56) References Cited

U.S. PATENT DOCUMENTS

2009/0044734 A1* 2/2009 Chuang .................. B23D 7/08
108/147

* cited by examiner

ADJUSTING DEVICE FOR LIFTING AND LOWERING A WORKBENCH

BACKGROUND OF THE INVENTION

1. Field of the Invention

This invention relates to a processing operation workbench, particularly to one provided with an adjusting device for lifting and lowering the workbench.

2. Description of the Prior Art

General processing operation will employ a workbench for placing a work piece to be processed to facilitate carrying out processing work. For instance, an abrasive belt machine used for woodwork grinding is provided with a workbench, and the workbench of a general abrasive belt machine is fitted thereon with a conveyer belt that is correspondingly provided with an abrasive belt wheel set so that when a work piece to be ground and processed is set on the conveyer belt, the work piece can be ground and processed by the abrasive belt wheel set.

However, after the conventional abrasive belt machine is used for a certain time and worn away and when the abrasive belt wheel set has to be replaced with a new one, or when the abrasive belt machine needs to be corrected and adjusted, the screwing fasteners that control tightness of the abrasive belt wheel set must be adjusted and corrected. But, the abrasive belt wheel set of the conventional abrasive belt machine is quite heavy and the screwing fasteners that lock the abrasive belt wheel set are numerous; therefore, when correcting and adjusting the abrasive belt machine, an operator usually has to waste much time and thus will influence work progress and greatly lower work efficiency. In view of such situation, the inventor of this invention, who has been engaged in production and marketing of related products for many years and has accumulated much technique and experience, actively carries out a research for ameliorating the defects of the conventional abrasive belt machine and hence devises this invention.

SUMMARY OF THE INVENTION

The objective of this invention is to offer an adjusting device for lifting and lowering a workbench. By making use of the adjusting device of this invention, a workbench can be lifted and lowered easily and hence an abrasive belt machine and other processing operation equipment can be corrected and adjusted with easiness, thus shortening time needed for correction and adjustment of a machine and enhancing work efficiency.

The adjusting device for lifting and lowering a workbench in the present invention is provided between a workbench and a workbench rest. The workbench has one side of its underside secured on the topside of the workbench rest and another side extending integrally to form a fixed plate, with an interval formed between the topside of the fixed plate and the topside of the workbench rest. An adjusting seat is firmly fixed with the workbench rest and bored with a longitudinal threaded hole. An adjusting wheel has one end screwed with the threaded hole of the adjusting seat and another end protruding out of the adjusting seat and further the adjusting wheel is bored with a longitudinal through hole. A screwing fastener has its upper end radially formed with a flange and its outer circumference fitted thereon with a bushing to press against the flange of the screwing fastener. Another end of the screwing fastener and the bushing are together inserted through the fixed plate of the workbench and the through hole of the adjusting wheel, and the bushing has its lower end pressing against the topside of the workbench rest, and the screwing fastener has its lower end screwed and locked with the workbench rest. Thus, the bushing has its upper end and its lower end respectively pushing against the flange of the screwing fastener and the topside of the workbench rest to have a first distance defined between the flange and the topside of the fixed plate. An elastic member is fitted around the outer circumference of the bushing and positioned between the flange of the screwing fastener and the topside of the fixed plate, and further the elastic member has a prestress toward the workbench.

The adjusting device for lifting and lowering a workbench of this invention is to have the prestress of the elastic member pressing against the workbench to enable the workbench to be surely driven by screw rotation of the adjusting wheel and hence, the adjusting wheel can easily actuate the workbench to move up and down. Thus, by making use of the adjusting device for lifting and lowering a workbench of this invention, an abrasive belt machine and other processing operation equipment can easily be corrected and adjusted for shortening time needed for correction and adjustment of a machine and elevating work efficiency.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
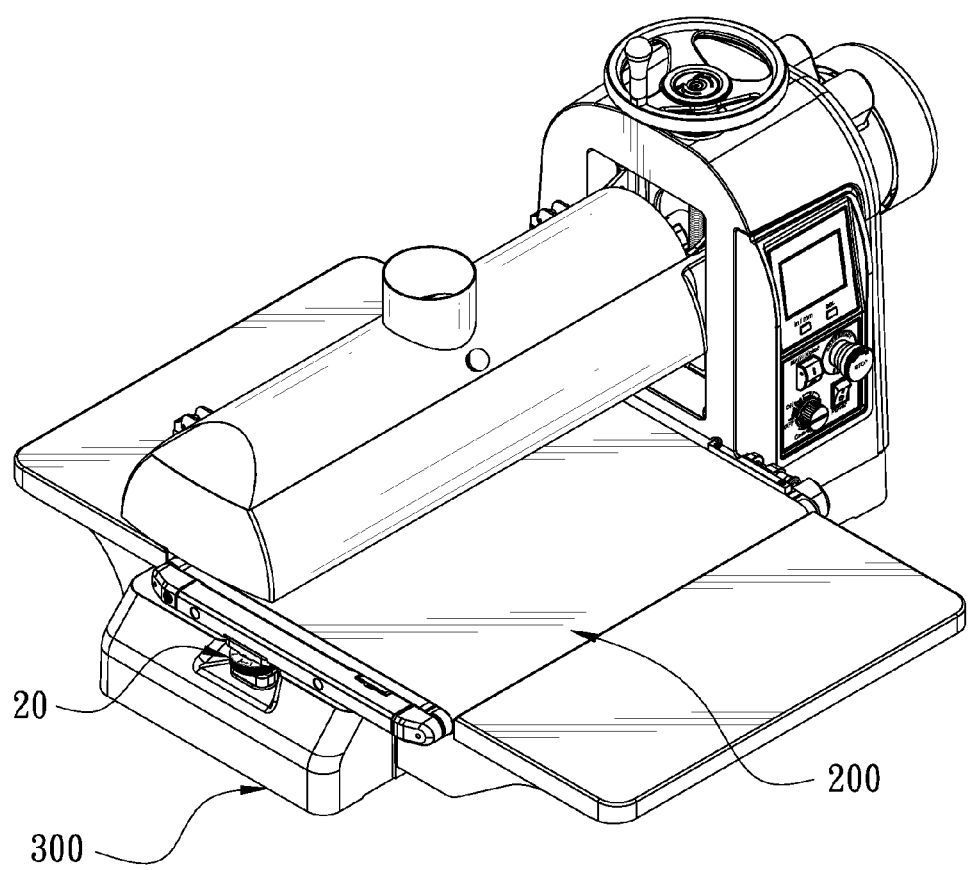
FIG. 1 is a perspective view of an adjusting device for lifting and lowering a workbench in the present invention.
Figure 2:
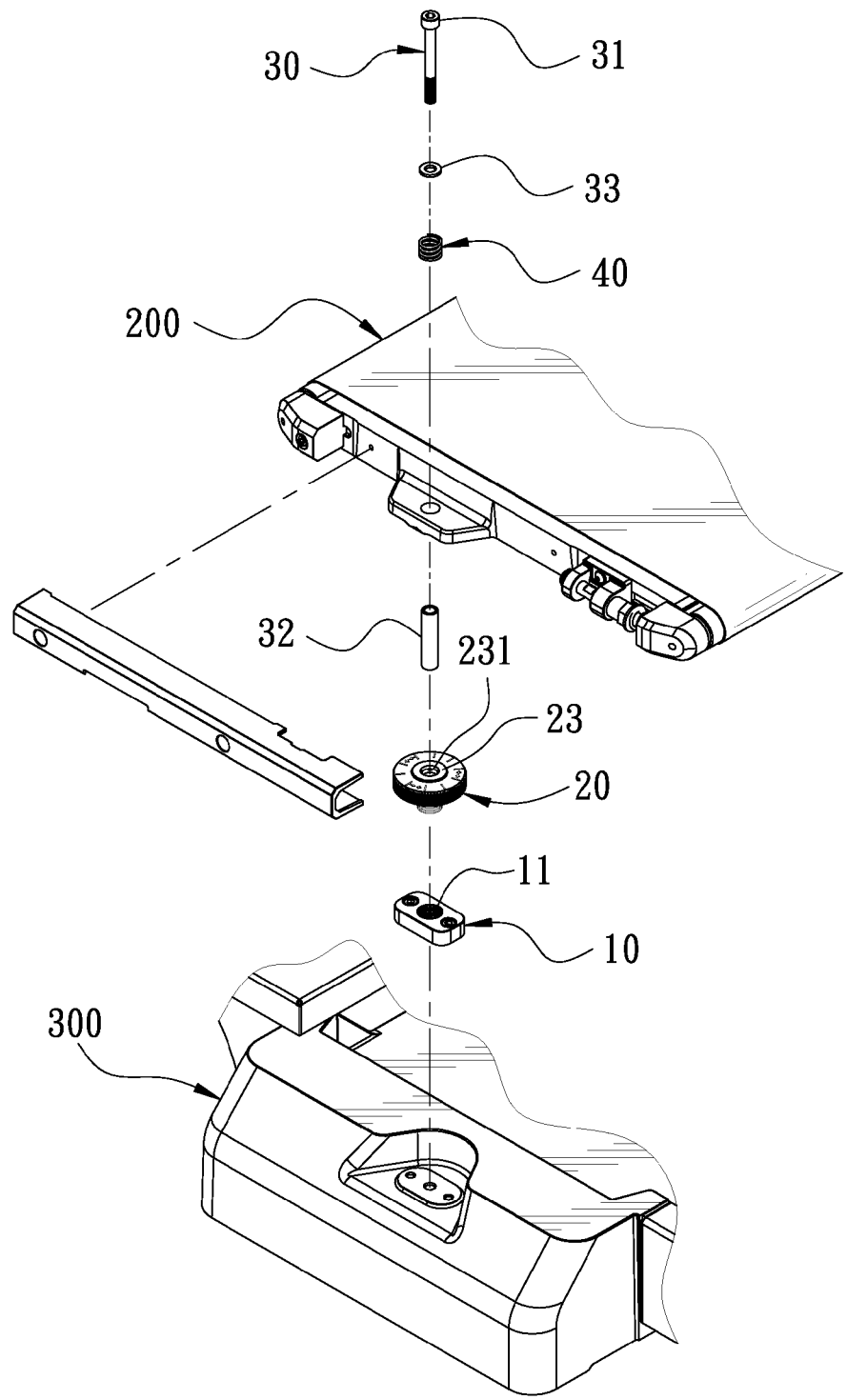
FIG. 2 is an exploded perspective view of the adjusting device for lifting and lowering a workbench in the present invention.
Figure 3:
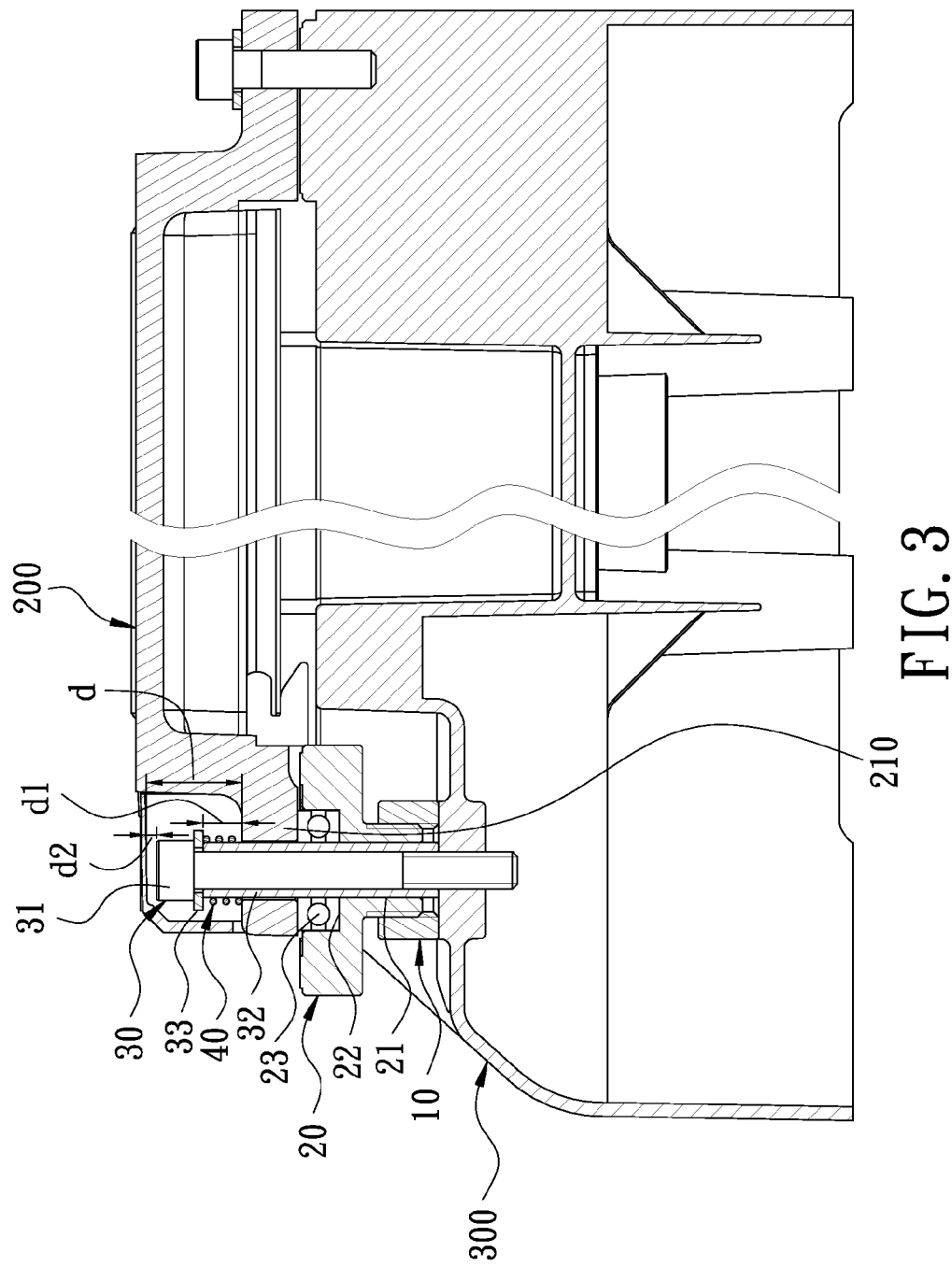
FIG. 3 is a cross-sectional view of the adjusting device for lifting and lowering a workbench in the present invention.

A preferred embodiment of an adjusting device for lifting and lowering a workbench in the present invention, as shown in FIGS. 1, 2 and 3, is to have the adjusting device provided between a workbench 200 and a workbench rest 300, with the workbench 200 positioned over the workbench rest 300.

The workbench 200 has one side of its underside secured on the topside of the workbench rest 300 and another side extending integrally to form a fixed plate 210, with a space interval (d) formed between the topside of the fixed plate 210 and the topside of the workbench rest 300.

An adjusting seat 10 is firmly fixed with the workbench rest 300 and bored with a longitudinal threaded hole 11.

An adjusting wheel 20 has one end thread ably fixed with the threaded hole 11 and another end protruding out of the adjusting seat 10. The adjusting wheel 20 is axially bored with a through hole 21 along the threaded hole 11, and the internal diameter of the through hole 21 of the adjusting wheel 20 is smaller than that of the threaded hole 11 of the adjusting set 10. Further, the adjusting wheel 20 has one side, which corresponds to the fixed plate 210, formed with a receiving groove 22 that is coaxial with the through hole 21, and a thrust bearing 23 is pivotally received in the receiving groove 22 to have the thrust bearing 23 pressing against the underside of the fixed plate 210, and the thrust bearing 23 has a central portion bored with an insert hole 231 corresponding with the through hole 21 of the adjusting wheel 20.

A screwing fastener 30 has its upper end radially formed with a flange 31 and its outer circumference fitted with a bushing 32 to push against the flange 31 of the screwing fastener 30, able to limit a locking depth of the screwing fastener 30. Another end of the screwing fastener 30 and the bushing 32 are together inserted through the fixed plate 210 of the workbench 200 and the through hole 21 of the adjusting wheel 20 to have the bushing 32 pressing against the topside of the workbench rest 300 and have the lower end of the screwing fastener 30 threadably locked with the workbench rest 300. Thus, the bushing 32 has two ends respectively pushing against the flange 31 of the screwing fastener 30 and the topside of the workbench rest 300, letting a first distance d1 defined between the flange 31 and the topside of the fixed plate 210 and a second distance d2 formed between the flange 31 and the topside of the workbench 200. In this invention, the screwing fastener 30 is a screw, and a washer 33 is further mounted under the flange 31 of the screwing fastener 30.

An elastic member 40 is fitted around the outer circumference of the bushing 32 and positioned between the flange 31 of the screwing fastener 30 and the topside of the fixed plate 210. The elastic member 40 has two ends respectively pressing against the washer 33 under the flange 31 of the screwing fastener 30 and the topside of the fixed plate 210 and is formed with a prestress toward the workbench 200. In this invention, the elastic member 40 is a spring and the prestress of the elastic member 40 is five kilograms.

In installing the adjusting device for lifting and lowering a workbench, referring to FIGS. 2 and 3, the adjusting seat 10 is first secured with the workbench rest 300, and the adjusting wheel 20 is screwed and fixed with the threaded hole 11 of the adjusting seat 10. Next, the screwing fastener 30 is orderly inserted through washer 33, the bushing 32 and the elastic member 40 and further through the fixed plate 210 and the adjusting seat 10 and then firmly locked with the workbench rest 300, thus finishing installation of the adjusting device for lifting and lowering a workbench. The bushing 32 functions to restrict a depth that the screwing fastener 30 is locked into the workbench rest 300 and defines the first distance d1 and the second distance d2. The first distance d1 enables the elastic member 40 to possess the prestress of five kilograms, while the second distance d2 keeps the screwing fastener 30 at a location lower than the topside of the workbench 200.

Figure 4:
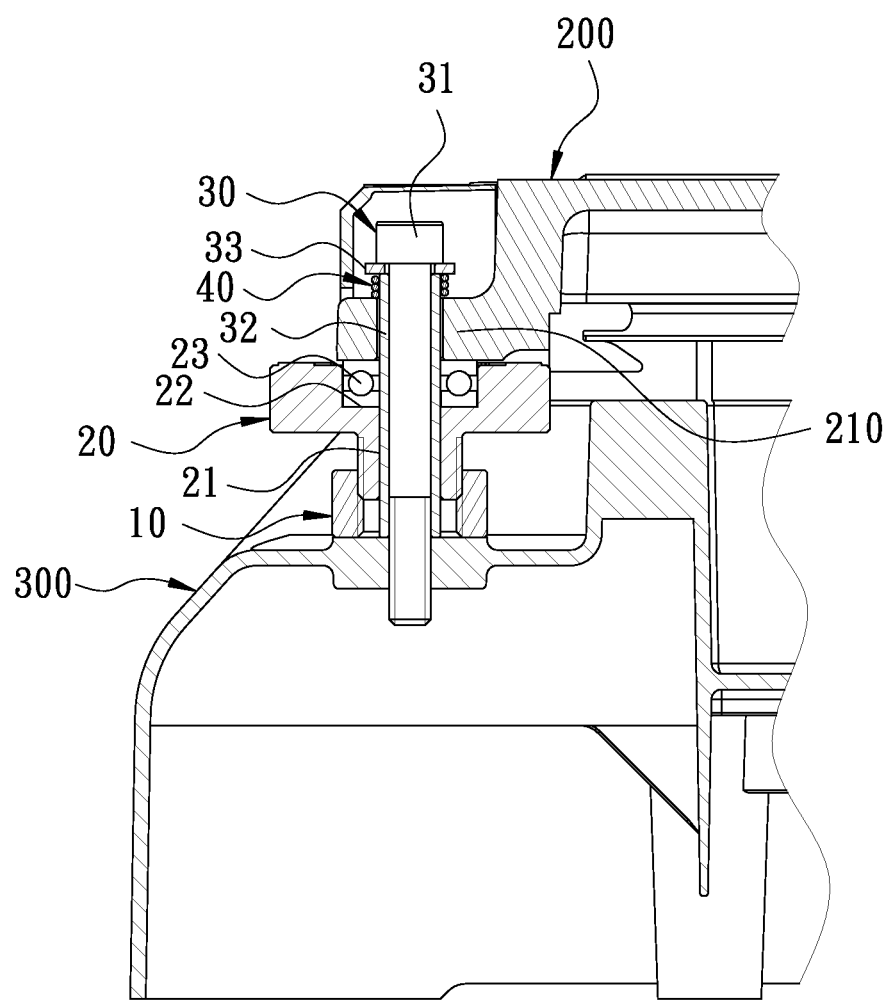
FIG. 4 is a schematic view of the adjusting device for lifting and lowering a workbench in a using condition in the present invention, showing that the workbench is adjusted to lift.
Figure 5:
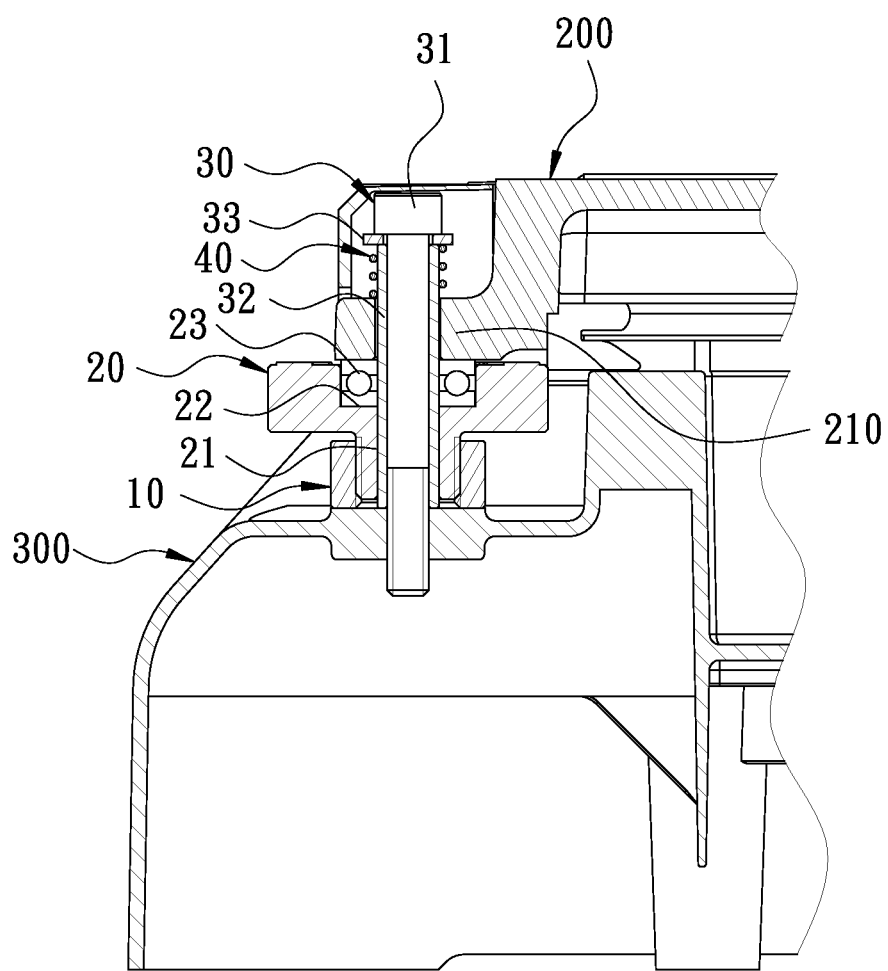
FIG. 5 is a schematic view of the adjusting device for lifting and lowering a workbench in a using condition in the present invention, showing that the workbench is adjusted to lower.

In use of the adjusting device for lifting and lowering a workbench, referring to FIGS. 4 and 5, when the workbench 200 is to be adjusted, only have the adjusting wheel 20 optionally screwed in or screwed out of the adjusting seat 10. When the adjusting wheel 20 is optionally screwed in the adjusting seat 10, the workbench 20 can be moved down along with the screw rotation of adjusting wheel 20, and when the adjusting wheel 20 is optionally screwed out of the adjusting seat 10, the workbench 200 can be moved up together with the adjusting wheel 20. Further, when the adjusting wheel 20 is optionally screwed in or screwed out of the adjusting seat 10, the prestress of the elastic member 40 will press against the topside of the fixed plate 210 to make the workbench 200 closely attached to the adjusting wheel 20. Thus, the workbench 200 can surely be actuated by screw rotation of the adjusting wheel 20 and hence the adjusting wheel 20 can easily drive the workbench 200 to carry out adjustment of moving up and moving down.

In this invention, the prestress of the elastic member 40 functions to press against the fixed plate 210 of the workbench 200, and the thrust bearing 23 enables the workbench 200 and the elastic member 40 to have their force acting on the adjusting wheel 20 in a way of surface contact; therefore, the adjusting wheel 20 can precisely and easily drive the workbench 200 to move up and move down. In addition, the elastic resistance of the elastic member 40 is able to buffer the inertia force produced when the adjusting wheel 20 is rotated, thus, enabling the workbench 200 to be surly driven to lift and lower by screw rotation of the adjusting wheel 20.

Figure 6:
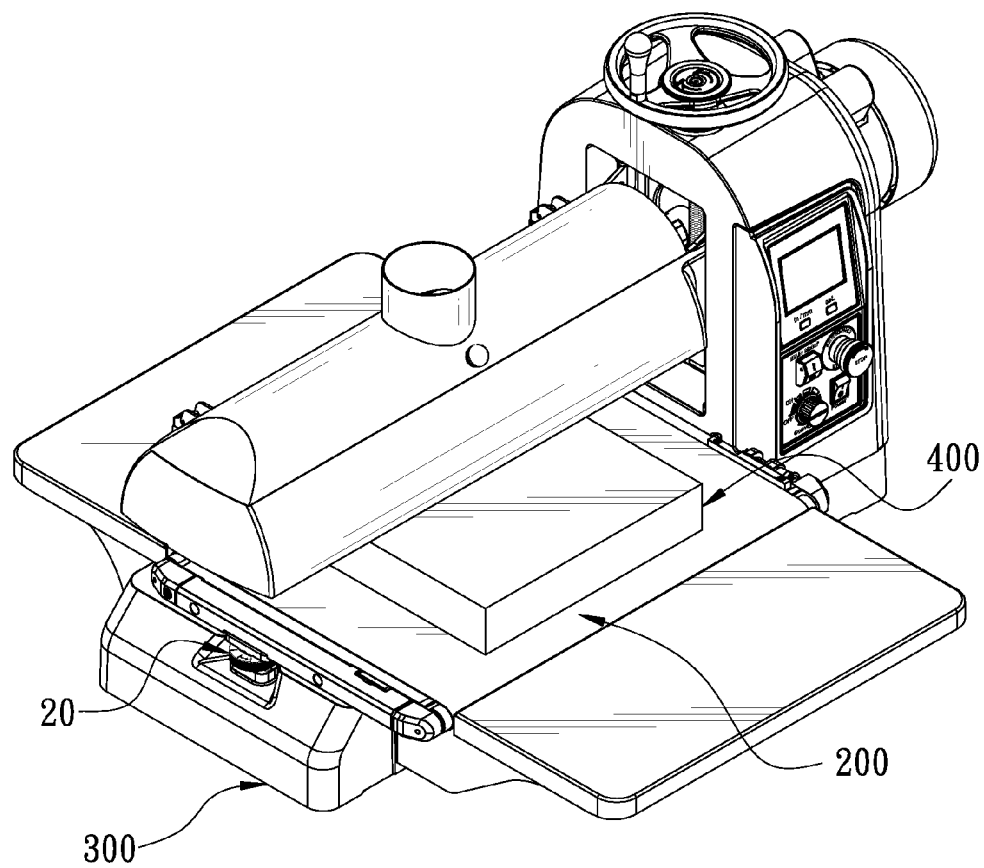
FIG. 6 is a schematic view of the adjusting device for lifting and lowering a workbench in a using condition in the present invention, showing that a work piece to be processed is placed on the workbench.

In this invention, the bushing 32 functions to limit a locking depth of the screwing fastener 30 and the first distance d1 and further restrict the prestress of the elastic member 40. When the adjusting wheel 20 is screwed out of the adjusting seat 10, the prestress of the elastic member 40 will increase by degrees to restrict a maximum distance that the adjusting wheel 20 is screwed out of the adjusting seat 10, thus, able to limit an adjusting space of the workbench 200 and maintain the second distance d2 for keeping the screwing fastener 30 at a position lower than the topside of the workbench 200; therefore, the surface of the workbench 200 can maintain a complete horizontal plane. By so designing, when a work piece 400 is being processed on the workbench 200, as shown in FIG. 6, the work piece 400 will not be affected at all by the screwing fastener 30 or by other members of the lifting adjusting device and hence the work piece 400 to be processed can be twice as large as the workbench 200.

This invention is provided with the adjusting wheel 20 for carrying out adjustment of the workbench 200, able to avoid the drawback of adjustment of the conventional abrasive belt wheel set, and the workbench of this invention is lighter than the conventional abrasive belt wheel set, thus economizing time and enhancing efficiency in adjustment of the workbench 200.

While the preferred embodiment of the invention has been described above, it will be recognized and understood that various modifications may be made therein and the appended claims are intended to cover all such modifications that may fall within the spirit and scope of the invention.

What is claimed is:

1. An adjusting device for lifting and lowering a workbench provided between a workbench and a workbench rest and characterized by:

said workbench having one underside secured on a topside of said workbench rest, said workbench having another underside extending integrally to form a fixed plate, a space interval formed between a topside of said fixed plate and a topside of said workbench rest;

an adjusting seat firmly fixed with said workbench rest, said adjusting seat bored with a longitudinal threaded hole;

an adjusting wheel having one end screwed with said threaded hole, said adjusting wheel having another end protruding out of said adjusting seat, said adjusting wheel bored with a longitudinal through hole;

a screwing fastener having an upper end formed with a flange, said screwing fastener having an outer circumference fitted with a bushing, said bushing pressing against said flange of said screwing fastener, another end of said screwing fastener together with said bushing inserted through said fixed plate of said workbench and said through hole of said adjusting wheel, said bushing pushing against a topside of said workbench rest, said screwing fastener having a lower end screwed and locked with said workbench rest, said bushing having an upper end and a lower end respectively pressing against said flange of said screwing fastener and a topside of said workbench rest, a first distance formed between said flange and a topside of said fixed plate; and an elastic member fitted around an outer circumference of said bushing and positioned between said flange of said screwing fastener and a topside of said fixed plate, said elastic member formed with a prestress toward said workbench;

said prestress of said elastic member functioning to push against said workbench to enable said workbench to be surely driven by screw rotation of said adjusting wheel, thus said adjusting wheel able to easily drive said workbench to move up and down.

2. The adjusting device for lifting and lowering a workbench as claimed in claim 1, wherein said adjusting wheel is provided with a receiving groove at one side corresponding to said fixed plate, said receiving groove and said through hole provided coaxially, said receiving groove of said adjusting wheel pivotally received therein with a thrust bearing, said thrust bearing pushing against an underside of said fixed plate.

3. The adjusting device for lifting and lowering a workbench as claimed in claim 2, wherein said thrust bearing is bored with a longitudinal insert hole at an intermediate portion.

4. The adjusting device for lifting and lowering a workbench as claimed in claim 1, wherein a washer is mounted between said flange of said screwing fastener and said elastic member.

5. The adjusting device for lifting and lowering a workbench as claimed in claim 1, wherein a second distance is formed between said flange of said screwing fastener and a topside of said workbench.

6. The adjusting device for lifting and lowering a workbench as claimed in claim 1, wherein an internal diameter of said through hole of said adjusting wheel is smaller than that of said threaded hole of said adjusting seat.

7. The adjusting device for lifting and lowering a workbench as claimed in claim 1, wherein said prestress of said elastic member is five kilograms.

8. The adjusting device for lifting and lowering a workbench as claimed in claim 1, wherein said screwing fastener is a screw.

9. The adjusting device for lifting and lowering a workbench as claimed in claim 1, wherein said elastic member is a spring.

* * * * *